United States Patent

Mitra

[11] Patent Number: 5,880,607
[45] Date of Patent: Mar. 9, 1999

[54] CLOCK DISTRIBUTION NETWORK WITH MODULAR BUFFERS

[75] Inventor: Sundari S. Mitra, Milpitas, Calif.

[73] Assignee: Sun Microsystems, Inc., Palo Alto, Calif.

[21] Appl. No.: 640,721

[22] Filed: May 1, 1996

[51] Int. Cl.[6] .................................................. H03K 19/00
[52] U.S. Cl. ............................... 326/93; 326/82; 327/144
[58] Field of Search .................................. 326/21, 93, 98, 326/86, 82; 327/144, 297; 364/489–491

[56] References Cited

U.S. PATENT DOCUMENTS

| | | | |
|---|---|---|---|
| 5,132,563 | 7/1992 | Fujii et al. ................................ | 326/27 |
| 5,396,129 | 3/1995 | Tabira .................................... | 326/21 X |
| 5,481,209 | 1/1996 | Lim et al. ................................ | 326/93 |
| 5,497,109 | 3/1996 | Honda et al. ............................ | 326/93 |
| 5,570,045 | 10/1996 | Erdal et al. .......................... | 327/297 X |
| 5,586,307 | 12/1996 | Wong et al. ......................... | 327/144 X |
| 6,235,521 | 8/1993 | Johnson et al. ......................... | 364/489 |

*Primary Examiner*—Jon Santamauro
*Attorney, Agent, or Firm*—The Gunnison Law Firm

[57] ABSTRACT

A n level clock distribution network for a datapath block includes an external buffer that outputs a clock signal and a datapath block having a logic block and a buffer block containing one or more nth-level buffers implemented with predefined modular buffers. The logic block includes one or more predefined areas containing clocked logic elements. The number of clocked logic elements in a predefined area is constrained to be less than or equal to a predetermined maximum number. Each nth-level buffer receives the clock signal outputted by the external buffer and distributes this clock signal to the clocked logic elements within a corresponding predefined area of the logic block. The nth-level buffer driving each predefined area is implemented by selecting one or more buffers from a family of predefined modular buffers appropriate for the number of clocked logic elements in the predefined area. In cases where more than one predefined modular buffer is selected, the selected predefined modular buffers are connected in parallel. Because a family of predefined modular buffers is used instead of custom buffers, the design of the buffer block is greatly simplified. Moreover, this network is easily implemented with an automated place and route design tool by predefining each modular buffer in a standard cell library of the automated place and route design tool.

38 Claims, 5 Drawing Sheets

CLOCK DISTRIBUTION NETWORK WITH MODULAR BUFFERS

FIELD OF THE INVENTION

The present invention relates to clock distribution networks and, more particularly, to multi-level clock distribution networks with modular buffers.

BACKGROUND

Large integrated circuits generally have a multi-level clock distribution network for providing clock signals to the clocked logic elements of the circuit. These networks are typically designed to be used with automated place and route design tools. In general, these clock distribution networks use several levels of buffers to distribute the clock signals to the clocked logic elements. Some automated place and route design tools attempt to equalize the clock line lengths and capacitive loading within each level of buffering. However, in conventional clock distribution schemes, the automated place and route design tools cannot efficiently route the clock lines from the lowest level of buffers to the clocked logic elements with low clock skew. As a result, the designer typically must hand tune the routing of the clock lines to the clocked logic elements at the lowest level of buffering. This hand tuning of the clock lines is necessary to reduce undesirable clock skew between the clocked logic elements.

Figure 1:
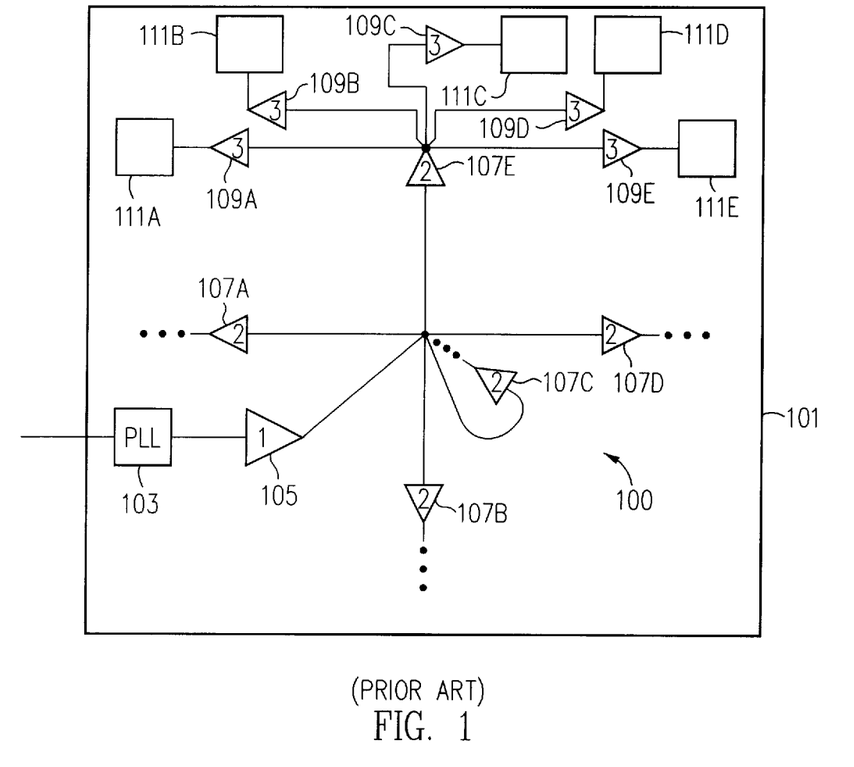
FIG. 1 is a block diagram of a conventional four level clock distribution network for an integrated circuit.

For example, FIG. 1 shows an exemplary clock distribution network 100 having four levels of buffering for an integrated circuit 101. The clock distribution network 100 includes a phase locked loop (PLL) 103 connected to a first-level buffer 105. The PLL 103 receives a raw clock signal from an off chip source (not shown) and outputs a clock signal synchronized with the raw clock signal. The clock signal outputted by the PLL 103 can be of a different frequency of than the raw clock signal outputted by the PLL 103 can be of a different frequency of than the raw clock signal. The first-level buffer 105 drives, in this example, five second-level buffers 107A–107E. In addition, in this example, each second-level buffer 107A–107E drives five third-level buffers. For clarity, only the third-level buffers 109A–109E driven by the second-level buffer 107E are shown. The third-level buffers 109A–109E respectively drive a corresponding datapath blocks 111A–111E. Each datapath block includes a logic block with a relatively large number (up to several hundred) of clocked logic elements such as flip flops. Each datapath block also includes fourth-level buffers connected to receive the buffered clock signals from the third-level buffers. The datapath block's fourth-level buffers provide clock signals to the clocked logic elements within the datapath block's logic block.

Figure 2:
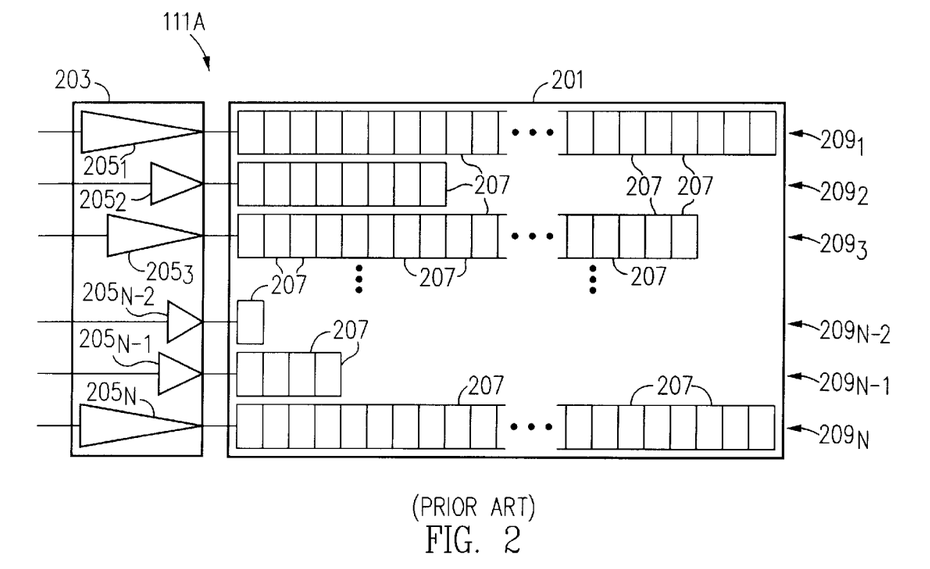
FIG. 2 is a block diagram of a datapath block of the integrated circuit depicted in FIG. 1.

FIG. 2 is an exemplary block diagram of the datapath block 111A shown in FIG. 1. The datapath block 111A includes a logic block 201 that has clocked logic elements distributed in N rows within the logic block, where N can be an integer greater than 1. The datapath block 111A also includes a buffer block 203 that includes fourth-level buffers $205_1$–$205_N$. These fourth-level buffers $205_1$–$205_N$ are coupled to receive the buffered clock signal from the third-level buffer 109A (FIG. 1) and drive flip-flops 207. Each fourth-level buffer $205_1$–$205_N$ respectively drives the flip-flops 207 located in a corresponding predefined area (i.e., a row in this embodiment) $209_1$–$209_N$. In this embodiment, the datapaths can be up to sixty-four bits wide. Consequently, the number of flip-flops in each row $209_1$–$209_N$ can vary between one and sixty-four. As is well known in the art of clock distribution networks, the capacitive loading driven by a clock buffer depends on both the length of the driven clock line as well as the capacitive loading of each of the clocked logic elements connected to the clock line. Because the number of clocked logic elements and the clock line length within each row can vary, the capacitive load driven by each fourth-level buffer can vary. As a result, each fourth-level buffer $205_1$–$205_N$ is typically custom designed to drive the particular capacitive load of its corresponding row $209_1$–$209_N$ to equalize the clock skew in the datapath block. The required customization of the fourth-level buffers undesirably increases the complexity, time and expense of designing the clock distribution network. Also, the input capacitance of each of the custom fourth-level buffers may be different, thereby introducing further complexity in equalizing the clock skew between the third-level buffers 107A–107E (FIG. 1) and the datapath blocks. As a result, the designer may be required to go through several iterations of designing the clock distribution network to achieve an acceptable clock skew. In addition, the custom fourth-level buffers may also increase or inefficiently utilize the area of the buffer block 201.

SUMMARY

According to the present invention, a n level clock distribution network for a datapath block includes an external buffer that outputs a clock signal and a datapath block having a logic block and a buffer block containing one or more nth-level buffers implemented with predefined modular buffers. The logic block includes one or more predefined areas containing clocked logic elements. The number of clocked logic elements in a predefined area is constrained to be less than or equal to a predetermined maximum number. Typically, this maximum is equal to the number of bits in a word used by the system in which the datapath block in incorporated. Each nth-level buffer receives the clock signal outputted by the external buffer and distributes this clock signal to the clocked logic elements within a corresponding predefined area of the logic block.

Because the predefined area has known dimensions, the length of the clock line from the external buffer to the clocked elements is known to within a range. In addition, the number of clocked logic elements is also known to within a range. As a result, the range of resistive-capacitive loading to each clocked element within the predefined area is known. Accordingly, the maximum clock skew between clocked logic elements within the predefined area can be optimized by varying the size of the nth-buffers in the buffer block, with the size of the nth-level buffers being within a known range.

In accordance with the present invention, the nth-buffer driving each predefined area is implemented by appropriately selecting one or more buffers from a family of predefined modular buffers. In cases where more than one predefined modular buffer is selected, the selected predefined buffers are connected in parallel. Because a family of predefined modular buffers is used instead of custom buffers, the design of the buffer block is greatly simplified. Moreover, this network is easily implemented with an automated place and route design tool by predefining each modular buffer in a standard cell library of the automated place and route design tool. Further, the modular buffers allow for efficient utilization of the buffer block area compared to non-modular approaches because a single large buffer would generally cause the buffer block to be wider.

In one embodiment, the clock distribution network is a four level network, with the fourth-level buffers being buffers within the datapath block's buffer block. The datapath block's logic block has rectangular predefined areas, with each rectangular area containing a row of up to sixty-four flip-flops. The modular buffers for implementing the buffers in the buffer block includes modular buffers for driving: (a) one flip-flop; (b) two flip-flops; (c) four flip-flops; (d) eight flip-flops; and (e) sixteen flip-flops. Thus, for example, a fourth-level buffer driving a row containing sixty-four flip-flops would be implemented with four sixteen-flip-flop modular buffers connected in parallel. Using different combinations of the predefined modular buffers, a fourth-level buffer can be implemented to drive a row containing any number of flip-flops.

In another embodiment, the datapath block's buffer block includes the (n-1)th-level buffers and the nth-level buffers. Each (n-1)th-level buffer drives a corresponding nth-level buffer. For example, in a five level clock distribution network, the buffer block includes the fourth and fifth-level buffers. For a particular datapath block, each fourth-level buffer receives a clock signal from the third-level buffer connected to the datapath block and provides the clock signal to the corresponding fifth-level buffer connected to the fourth-level buffer. The fifth-level buffers are implemented as described above for the fourth-level buffers of the previous embodiment. In this embodiment, the fourth-level buffers have a more consistent input capacitance than the various possible fifth-level buffers, thereby helping to reduce clock skew between the third level buffers and the datapath blocks.

In still another embodiment, each (n-1)th-level buffers is selected from a standard cell library according to the number and size of predefined modular buffers used to implement the nth-level buffer connected to the (n-1)th-level buffer. This scheme can also be easily implemented in an automated place and route design tool. For relatively large capacitive loads (i.e., caused by a large number of large modular) a large (n-1)th-level buffer is used to compensate for the longer rise and fall times caused by the relatively large load. In contrast, for a predefined area containing only a few clocked logic elements, a relatively small (n-1)th-level buffer can be used. As a result, the rise and fall times of the clock signals are more closely equalized, thereby further reducing the clock skew.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

Figure 3:
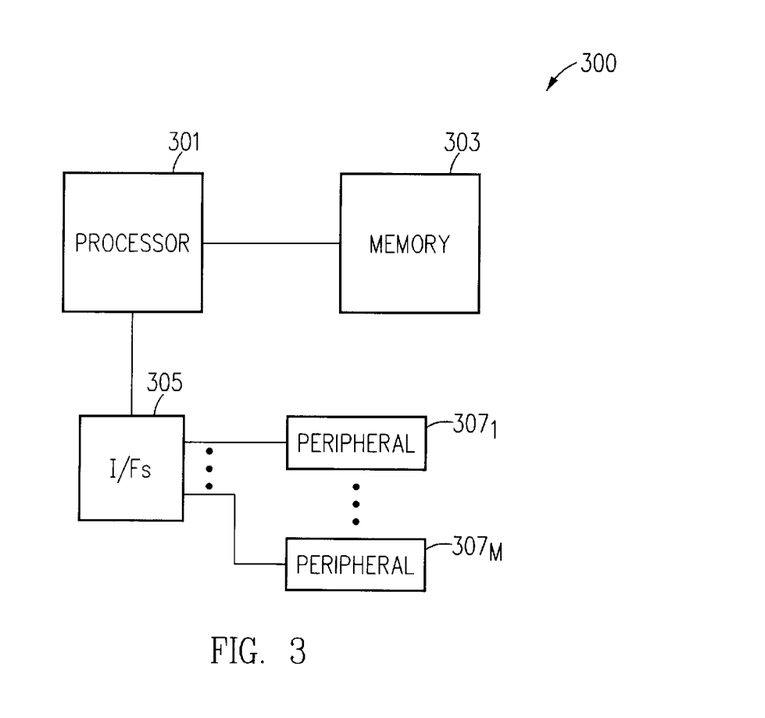
FIG. 3 is a block diagram of an electronic system having an integrated circuit implementing a modular clock distribution network according to one embodiment of the present invention.

FIG. 3 is a block diagram of an electronic system 300 having an integrated circuit 301 implementing a modular clock distribution network (described below in conjunction with FIGS. 4–6) according to one embodiment of the present invention. As used herein, a datapath block refers to block of circuitry having a buffer block and a logic block with the logic block having clocked logic elements such as, for example, flip-flops for performing logic operations on received digital signals. Datapath blocks tend to have a relatively large number clocked logic elements, which results in a relatively large capacitive load for the clock buffers driving the clock signal to the clocked logic elements. The electronic system 300 can be any type of computer or electronic system. In this embodiment, the electronic system 300 is a computer system where the integrated circuit 301 is a processor connected to a memory 303 and to interfaces 305 to interact with peripherals $307_1$–$307_N$. The processor can be any type of processor such as, for example, "X86"-type, Sparc®, Alpha®, MIPS®, HP®, Pentium® and PowerPC® processors. The memory 303 and the interfaces 305 can be any type of memory or interface for use in a computer system. Likewise, the peripherals can be any type of peripheral such as, for example, displays, mass storage devices, keyboards or any other type of input or input-output device, for use in a computer system.

Figure 4:
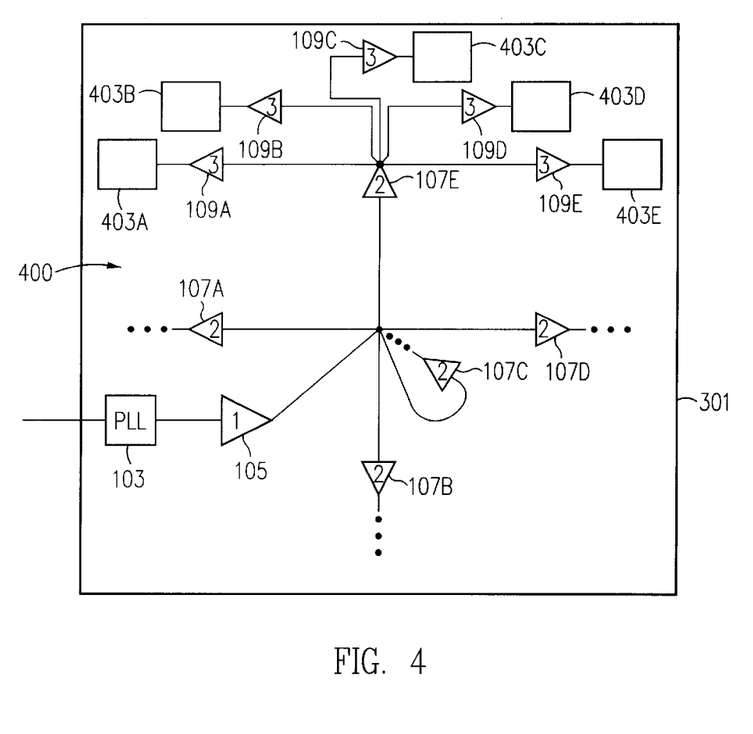
FIG. 4 is a block diagram of an integrated circuit having a five level clock distribution network according to one embodiment of the present invention.

FIG. 4 is a block diagram of a five level clock distribution network 400 implemented in the processor 301 of the computer system 300 (FIG. 3), according to one embodiment of the present invention. The clock distribution network 400 is similar to the clock distribution network 100 (FIG. 1), except that the clock distribution network 400 has datapath blocks 403A–403B (described below in conjunction with FIG. 5) instead of datapath blocks 111A–111E as in the clock distribution network 100. Accordingly, as described above in conjunction with FIG. 1, the clock distribution network 400 includes the PLL 103 that drives the first-level buffer 105, which in turn drives the five second-level buffers 107A–107B. Each of the five second-level buffers 107A–107E drives five third-level buffers. For clarity, only the five third-level buffers 109A–109B driven by the second-level buffer 107E are shown in FIG. 4. The five third-level buffers 109A–109E are coupled to the datapath blocks 403A–403E, respectively. The datapath blocks 403A–403E each include fourth-level and fifth-level buffers, which are described below in conjunction with FIG. 5.

Although a five level clock distribution network for a processor is described, in other embodiments the clock distribution network can be implemented in other types of integrated circuits. The present invention is advantageously used in any integrated circuit with datapath blocks. Further, the number of levels in the clock distribution network can be adapted to the requirements of the integrated circuit and need not have five levels. In addition, a clock distribution network according to the present invention can be used in conjunction with other clock distribution networks such as, for example, the control block clock distribution disclosed in co-filed and commonly assigned U.S. Pat. application Ser. No. 08/641,509 entitled "A Reduced Skew Control Block Clock Distribution Network" by S. Mitra, which is incorporated herein by reference.

Figure 5:
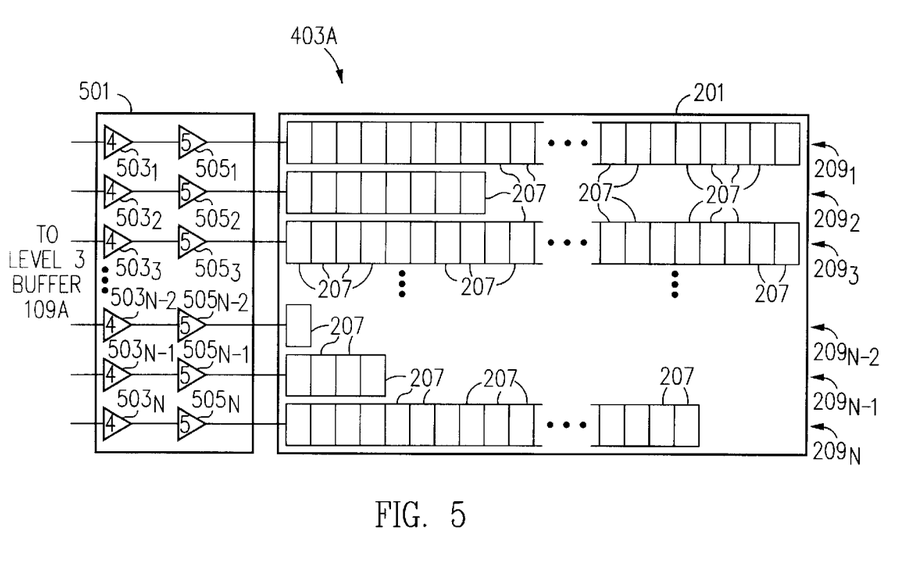
FIG. 5 is a block diagram of a datapath block according to one embodiment of the present invention.

FIG. 5 is a block diagram of one embodiment of the datapath block 403A (FIG. 4), according to the present invention. The datapath block 403A includes a logic block 201 having predefined areas $209_1$–$209_N$ substantially similar to the logic block 201 described above in FIG. 2. The datapath block 403A also includes a buffer block 501 with fourth-level buffers $503_1$–$503_N$ that are connected to receive a clock signal from the third-level buffer 109A (FIG. 4). The fourth-level buffers $503_1$–$503_N$ are respectively connected to fifth-level buffers $505_1$–$505_N$ (described further below in conjunction with FIG. 6). The fifth-level buffers $505_1$–$505_N$ are connected to the flip-flops 207 in the predefined areas $209_1$–$209_N$, respectively. The datapath blocks 403B–403E (FIG. 4) are substantially similar to the datapath block 403A, but each datapath block may include a different number or combination of predefined areas, logic elements and buffers, depending on the datapath block's functions.

In this embodiment, each predefined area $209_1$–$209_N$ is rectangular in shape and includes between one and sit-four clocked logic elements 207. For example, the predefined areas $209_1$ and $209_3$ each contain sixty-four clocked elements 207; the predefined area $209_2$ contains eight; the predefined area $209_{N-2}$ contains one; and so on. Consequently, the capacitive loading of each predefined area $209_1$–$209_N$ can vary to a relatively large degree. In this embodiment, the clocked logic elements are flip-flops, but any suitable clocked logic element can be used. Each flip-flop can be implemented using any suitable flip-flop such as, for example, the flip-flop disclosed in co-filed and commonly assigned U.S. Pat. application Ser. No. 08/640, 562 entitled "Flip-Flop With Full Scan Capability" by S. Mitra, which is incorporated herein by reference Within each predefined area $209_1$–$209_N$, the clocked elements 207 are arranged in a row. Of course, in other embodiments, the predefined areas can be in any suitable predefined shape, and the clocked logic elements 207 can be laid out in any suitable predefined arrangement. For clarity, only the clock line interconnections to the first flip-flops in a row are shown. It is understood that each in the predefined areas $209_1$–$209_N$ receives a clock signal from the predefined area's corresponding fifth-level buffer $505_1$–$505_N$, and that the control, input and output leads of the flip-flops are interconnected with other flip-flops in the logic block 201 or with other circuitry external to the datapath block 430A.

The output leads of the fourth-level buffers $503_1$–$503_N$ are connected to the input leads of the fifth-level buffers $505_1$–$505_N$, respectively. The size of the fifth-level buffers $505_1$–$505_N$ depends on the number of clocked logic elements 207 contained in the predefined areas $209_1$–$209_N$, respectively. The fifth-level buffers are implemented with predefined modular buffers selected from a family of predefined modular buffers. Each modular buffer can be implemented using any suitable buffer such as, for example, the buffer disclosed in co-filed and commonly assigned U.S. Pat. application Ser. No. 08/640,660 entitled "Final Stage Clock Buffer in a Clock Distribution Network" by S. Mitra, which is incorporated herein by reference. The buffer disclosed in Ser. No. 08/640,660 has a low input capacitance, thereby reducing the capacitive load driven by the fourth-level buffers. Thus, the fourth-level buffers $503_1$–$503_N$ typically can be smaller (and, thus, dissipating less power) than any of the fourth-level buffers $205_1$–$205_N$ (FIG. 2). Of course, smaller size and low power dissipation are very desirable attributes in many applications.

In accordance with the present invention, each predefined modular buffer is designed to drive a clock signal to a predetermined number of clocked logic elements. For example, in this embodiment, the family of predefined modular buffers for implementing the fifth-level buffers include predefined modular buffers for driving: (i) one flip-flop; (ii) two flip-flops; (iii) four flip-flops; (iv) eight flip-flops; and (v) sixteen flip-flops. For fifth-level buffers driving a number of flip-flops different from one, two, four, eight or sixteen, the selected modular buffers are connected in parallel to form the appropriate fifth-level buffer. Thus, for example, the fifth-level buffer $505_1$, which drives six-four flip-flops, is implemented with four sixteen-flip-flop modular buffers connected in parallel. As a result, the fifth-level buffers $505_1$–$505_N$ are easily implemented, thereby substantially reducing the design time and cost compared to designing custom buffers as in conventional networks. Further, these predefined modular buffers can be easily defined in a standard cell library for use in an automated place and route design tool by those skilled in the art of clock distribution networks to further reduce the time and cost of designing the clock distribution network.

Figure 6:
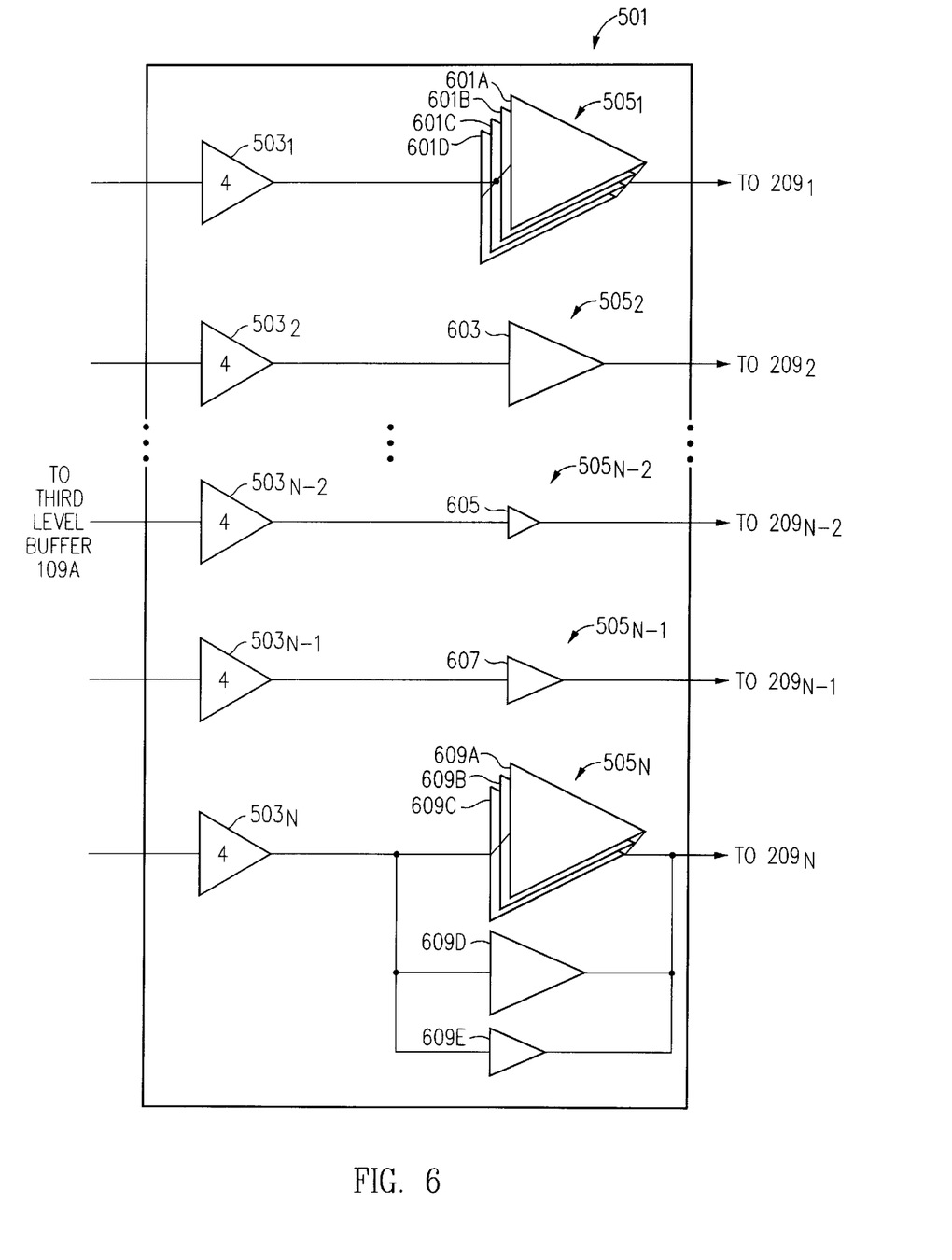
FIG. 6 is a block diagram of a buffer block according to one embodiment of the present invention.

FIG. 6 is a block diagram of the buffer block 501 shown in FIG. 5, according to one embodiment of the present invention. As described above, the fifth-level buffer $505_1$ is implemented with four sixteen-flip-flop modular buffers 601A–601D connected in parallel. Because predefined area $209_2$ (FIG. 5) contains only eight clocked elements, the fifth-level buffer $505_2$ is implemented with a single eight-flip-flop modular buffer 603. Similarly, the fifth-level buffer $505_{N-2}$ is implemented with a one-flip-flop modular buffer 605 to drive the clock signal to the single flip-flop in the predefined area $209_{N-2}$. Likewise, the fifth-level buffer $505_{N-1}$ is implemented with a four-flip-flop modular buffer 607 to drive the four flip-flops in the predefined area $209_{N-1}$. The fifth-level buffer $505_N$, which drives sixty flip-flops, is implemented with three sixteen-flip-flop modular buffers 609A–609C connected in parallel with an eight-flip-flop modular buffer 609D and a four-flip-flop modular buffer 609E. Optionally, the lengths of the lines connecting the fourth-level buffer $503_N$ to the modular buffers 609A–609E (and the modular buffers to the predefined area $209_N$) can be equalized. Of course, different combinations of the predefined modular buffers can be used to implement a fifth-level buffer of a size appropriate for the number of clocked elements in the fifth-level buffer's corresponding predefined area. In this embodiment, the predefined modular buffers are implemented using the buffers disclosed in the aforementioned U.S. Pat. application Ser. No. 08/640,660.

In addition, in another embodiment, the buffer block 501 can be implemented according to the disclosure of the aforementioned U.S. Pat. application Ser. No. 08/641,509. By using a control block according to Ser. No. 08/641,509 to implement the buffer block 501, each fourth-level buffer $503_1$–$503_N$ can be sized according to the capacitive loading of the corresponding fifth-level buffer $503_1$–$503_N$ to further reduce clock skew. As disclosed in to Ser. No. 08/641,509, each fourth-level buffer is selected from a finite set of predefined buffers of differing sizes. The size of the selected predefined buffer for a particular fourth-level buffer depends on the number of fifth-level buffers driven by this fourth-level buffer and the clock line length to the fifth-level buffers.

Figure 7A:
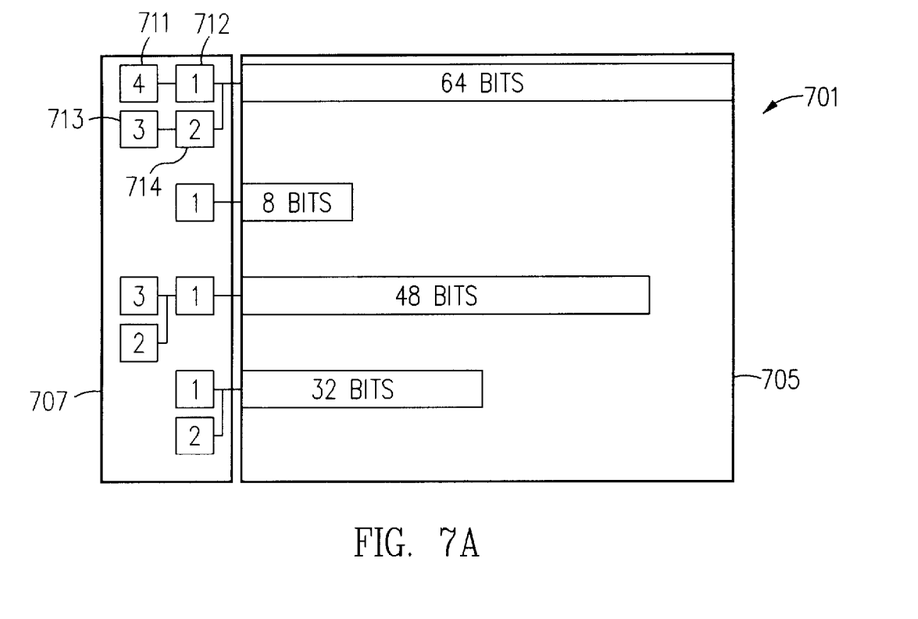
FIG. 7A is a block diagram illustrating a layout of an exemplary datapath block according to one embodiment of the present invention.
Figure 7B:
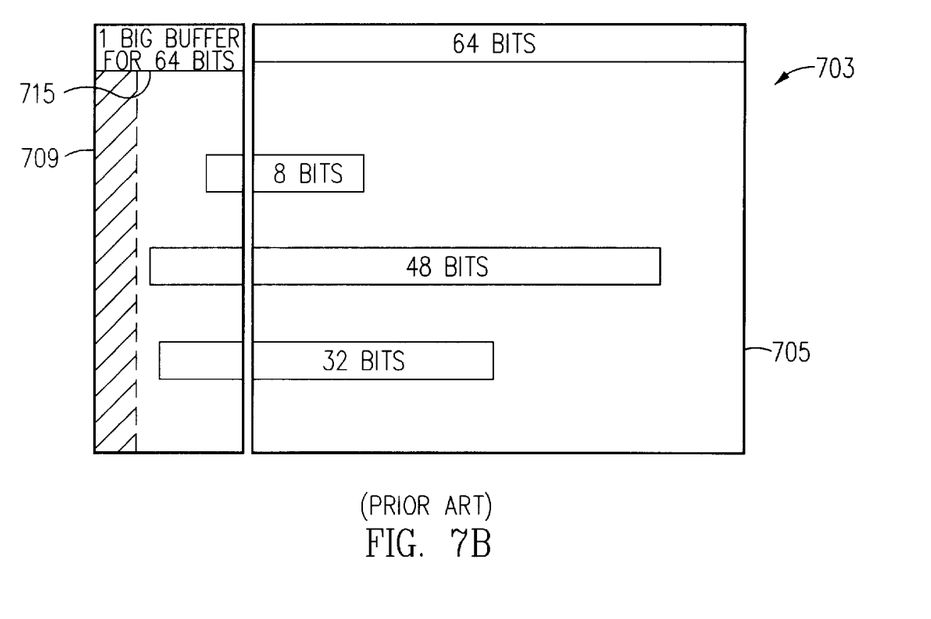
FIG. 7B is a block diagram illustrating a layout of a prior art conventional datapath block.

Because of the standardization utilized in the present invention, datapath block clock skew is efficiently reduced without undesirable customization of the buffers. In addition, the standardization allows for efficient utilization of the buffer block area, thereby reducing the size of the buffer block compared to conventional datapath blocks using non-modular buffers. For example, FIGS. 7A and 7B illustrate the layouts of an exemplary datapath block 701 according to one embodiment of the present invention and a conventional datapath block 703. Both datapath blocks have substantially identical logic blocks 705, but the datapath block 701 includes a buffer block 707 containing modular buffers according to the present invention, whereas the conventional datapath block 703 includes a buffer block 709 with conventional non-modular buffers.

The buffer block 707 of the datapath block 701 includes four modular buffers 711–714 that drive sixty-four flip-flops. In contrast, the buffer block 709 of the conventional datapath block 703 has one large non-modular buffer 715 to drive sixty-four flip-flops. The large non-modular buffer 715 increases the width of the buffer block 709 compared to the buffer block 707. As a result, the buffer block 707 has a smaller area than the buffer block 709. Accordingly, the modular buffer scheme of the present invention more efficiently utilizes area than conventional datapath blocks.

In another embodiment of the present invention, the buffer block 501 can be implemented without the fourth-level buffers $503_1$–$503_N$, resulting in a four level clock distribution network. In this embodiment, the buffers $505_1$–$505_N$ become the fourth-level buffers and are connected to receive the clock signal directly from the third-level buffer 107A (FIG. 4). The buffers $505_1$–$505_N$ are still implemented using predefined modular buffers as described above. As a result, the buffer block 501 requires less area. However, this embodiment typically requires adjustments (e.g., hand tuning) in the line length between the third-level buffer 107A to some of the buffers $505_1$–$505_N$ to equalize the capacitive loading to achieve the same clock skew as the embodiment of FIG. 4. Thus, this embodiment can increase the complexity and design time of the clock distribution network. In addition, this embodiment may offset the buffer block area reduction with an increase in area from increasing the clock line length in equalizing the capacitive loading between the third-level buffer 107A and the buffers $505_1$–$505_N$.

The embodiments of the modular clock distribution network described above are illustrative of the principles of this invention and are not intended to limit the invention to the particular embodiments described. For example, the clocked logic elements can be any type of clocked logic element in addition to flip-flops. In other embodiments, the last level of buffers (e.g., the fifth-level buffers in a five level clock distribution network) may be located near the center of the predefined area instead of at one end. In still another embodiment, the penultimate level (e.g., the fourth-level buffers in a five level clock distribution network) of buffers may be coupled to more than one fifth-level buffers. Accordingly, while the preferred embodiment of the invention has been illustrated and described, it will be appreciated that in view of this disclosure various changes can be made therein without departing from the spirit and scope of the invention.

The embodiments of the invention in which an exclusive property or privilege is claimed are defined as follows:

1. A clock distribution network having n levels, n being an integer greater than 1, said clock distribution network comprising:

a logic block having a first predefined area containing substantially only clocked logic elements; and a nth-level modular buffer disposed outside of and coupled to said first predefined area of said logic block, wherein said nth-level modular buffer is configured to distribute a clock signal to said clocked logic elements within said predefined area of said logic block, and wherein said nth-level modular buffer is implemented by interconnecting one or more predefined buffers selected from a finite set of predefined buffers having different sizes.

2. The clock distribution network of claim 1 wherein each said predefined buffer of said finite set of predefined buffers is sized to drive a different predetermined number of clocked logic elements.

3. The clock distribution network of claim 2 wherein said finite set of predefined buffers includes a first predefined buffer sized to drive one clocked logic element, a second predefined buffer sized to drive two clocked logic elements, a third predefined buffer sized to drive four clocked logic elements, a fourth predefined buffer sized to drive eight clocked logic elements, and a fifth predefined buffer sized to drive sixteen clocked logic elements.

4. The clock distribution network of claim 3 wherein said nth level modular buffer is implemented using one or more of said predefined buffers connected in parallel.

5. The clock distribution network of claim 4 further comprising a (n-1)th-level modular buffer coupled to said nth-level modular buffer, wherein said (n-1)th-level modular buffer provides a clock signal to said nth-level modular buffer.

6. The clock distribution network of claim 5 further comprising a buffer block coupled to said logic block, said (n-1)th modular buffer and said nth-level modular buffer being disposed within said buffer block.

7. The clock distribution network of claim 6 wherein said logic block comprises a plurality of predefined areas of clocked logic elements, each predefined area of said plurality of predefined area containing substantially only clocked logic elements.

8. The clock distribution network of claim 7 wherein said buffer block further comprises a plurality of nth-level modular buffers, each nth-level modular buffer of said plurality of nth-level modular buffers being coupled to a corresponding predefined area of said plurality of predefined areas.

9. The clock distribution network of claim 8 wherein said buffer block further comprises a plurality of (n-1)th-level modular buffers, each (n-1)th-level modular buffer of said plurality of (n-1)th-level modular buffers being coupled to a corresponding nth-level modular buffer of said plurality of nth-level modular buffers.

10. The clock distribution network of claim 9 further comprising a plurality of logic blocks, each logic block having a plurality of predefined areas of clocked logic elements, and further comprising a plurality of buffer blocks coupled to said plurality of logic blocks, each buffer block comprising a plurality of nth-level modular buffers and a plurality of (n-1)th-level modular buffers.

11. The clock distribution network of claim 9 wherein n is greater than four.

12. The clock distribution network of claim 9 wherein each said (n-1)th-level modular buffer of said plurality of (n-1)th-level modular buffers is implemented with a predefined buffer selected from a finite set of predefined buffers of differing sizes.

13. The clock distribution network of claim 12 wherein said implementation of a particular (n-1)th-level modular buffer of said plurality of (n-1)th-level modular buffers depends on the number of nth-level modular buffers coupled to said particular (n-1)th-level modular buffer.

14. The clock distribution network of claim 12 wherein said implementation of a particular (n-1)th-level modular buffer of said plurality of (n-1)th-level modular buffers depends on the clock line length driven by said particular (n-1)th-level modular buffer.

15. A computer system comprising:
   a memory;
   an interface, wherein said interface is configured to interact with a peripheral device; and
   a circuit coupled to said memory and said interface, said circuit comprising:
   a logic block having a first predefined area containing substantially only clocked logic elements, and
      a clock distribution network having n levels, n being an integer greater than 1, the clock distribution network including a nth-level modular buffer disposed outside of and coupled to said first predefined area of said logic block, wherein said nth-level modular buffer is configured to distribute a clock signal to said clocked logic elements within said first predefined area of said logic block, and wherein said nth-level modular buffer is implemented by interconnecting one or more predefined buffers selected from a finite set of predefined buffers having differing sizes.

16. The computer system of claim 15 wherein each said predefined buffer of said finite set of predefined buffers is sized to drive a different predetermined number of clocked logic elements.

17. The computer system of claim 16 wherein said finite set of predefined buffers includes a first predefined buffer sized to drive one clocked logic element, a second predefined buffer sized to drive two clocked logic elements, a third predefined buffer sized to drive four clocked logic elements, a fourth predefined buffer sized to drive eight clocked logic elements, and a fifth predefined buffer sized to drive sixteen clocked logic elements.

18. The computer system of claim 17 wherein said nth level modular buffer is implemented using one or more of said predefined buffers connected in parallel.

19. The computer system of claim 17 further comprising a (n-1)th-level modular buffer coupled to said nth-level modular buffer, wherein said (n-1)th-level modular buffer provides a clock signal to said nth-level modular buffer.

20. The computer system of claim 19 further comprising a buffer block coupled to said logic block, said (n-1)th buffer and said nth-level modular buffer being disposed within said buffer block.

21. The computer system of claim 20 wherein said logic block comprises a plurality of predefined areas of clocked logic elements, each predefined area of said plurality of predefined areas containing substantially only clocked logic elements.

22. The computer system of claim 21 wherein said buffer block further comprises a plurality of nth-level modular buffers, each nth-level modular buffer of said plurality of nth-level modular buffers being coupled to a corresponding predefined area of said plurality of predefined areas.

23. The computer system of claim 22 wherein said buffer block further comprises a plurality of (n-1)th-level modular buffers, each (n-1)th-level modular buffer of said plurality of (n-1)th-level modular buffers being coupled to a corresponding nth-level modular buffer of said plurality of nth-level modular buffers.

24. The computer system of claim 23 further comprising a plurality of logic blocks, each logic block having a plurality of predefined areas of clocked logic elements, and further comprising a plurality of buffer blocks coupled to said plurality of logic blocks, each buffer block including a plurality of nth-level modular buffers and a plurality of (n-1)th-level modular buffers.

25. The computer system of claim 23 wherein each said (n-1)th-level modular buffer of said plurality of (n-1)th-level modular buffers is implemented with a predefined buffer selected from a finite set of predefined buffers of differing sizes.

26. A method for implementing a n level datapath block distribution network in a circuit, n being an integer greater than 1, said datapath block including a logic block having clocked logic elements and a buffer block proximate to said logic block, said method comprising:
   disposing clocked logic elements in a first predefined area of said logic block;
   implementing a first nth-level modular buffer by interconnecting one or more predefined buffers selected from a finite set of predefined buffers having differing sizes; and
   disposing said first nth-level modular buffer within said buffer block and coupling said first nth-level modular buffer to said clocked logic elements within said first predefined area, wherein said first predefined area of said logic block contains substantially only said clocked logic elements, and wherein said first nth-level modular buffer is configured to distribute a clock signal to said clocked logic elements within said first predefined area of said logic block.

27. The method of claim 26 wherein each said predefined buffer of said finite set of predefined buffers is sized to drive a different predetermined number of clocked logic elements.

28. The method of claim 27 wherein said finite set of predefined buffers includes a first predefined buffer sized to drive one clocked logic element, a second predefined buffer sized to drive two clocked logic elements, a third predefined buffer sized to drive four clocked logic elements, a fourth predefined buffer sized to drive eight clocked logic elements, and a fifth predefined buffer sized to drive sixteen clocked logic elements.

29. The method of claim 28 further comprising implementing said nth-level modular buffer by connecting in parallel one or more predefined buffers.

30. The method of claim 28 further comprising disposing a (n-1)th-level modular buffer within said buffer block and coupling said (n-1)th-level modular buffer to said nth-level modular buffer.

31. The method of claim 30 wherein:
   said disposing of clocked logic elements further comprises disposing substantially all of said clocked logic elements of said logic block within a plurality of predefined areas within said logic block, said plurality of predefined areas including said first predefined area;
   said implementing of a first nth-level modular buffer further comprises implementing a plurality of nth-level modular buffers using one or more predefined buffers selected from a finite set of predefined buffers, said plurality of nth-level modular buffers including said first nth-level modular buffer; and
   said disposing of said nth-level modular buffer within said buffer block further comprises disposing said plurality of nth-level modular buffers within said buffer block and coupling said plurality of nth-level modular buffers to said clocked elements within said corresponding predefined areas of plurality of predefined areas, wherein each predefined area of said plurality of predefined areas contains substantially only clocked logic elements, and wherein each nth-level modular buffer of said plurality of nth-level modular buffers is configured to distribute a clock signal to said clocked elements within the corresponding predefined area of said plurality of predefined areas.

32. The method of claim 31 further comprising disposing a plurality of (n-1)th-level modular buffers within said buffer block and coupling each (n-1)th-level modular buffer of said plurality of (n-1)th-level modular buffers to a corresponding said nth-level modular buffer of said plurality of nth-level modular buffers.

33. The method of claim 32 further comprising implementing each said (n-1)th-level modular buffer of said plurality of (n-1)th-level modular buffers with a buffer selected from a finite set of predefined buffers having differing sizes, wherein said selection of a particular predefined buffer of said finite set of predefined buffers is dependent on a capacitive load coupled to said (n-1)th-level modular buffer.

34. The method of claim 33 wherein an automated place and route tool performs said method.

35. A method for distributing a clock signal, said method comprising:

providing a clock signal from a first (n-1)th-level modular, n being an integer greater than 1, said first (n-1)th-level modular buffer being disposed within a buffer block;

implementing a first nth-level modular buffer by interconnecting one or more predefined buffers selected from a finite set of predefined buffers having differing sizes;

receiving said clock signal from said first (n-1)th-level modular buffer at said first nth-level modular buffer, said first nth-level modular buffer being disposed with said buffer block; and distributing said clock signal received at said first nth-level modular to a plurality of clocked logic elements disposed within a predefined area of a logic block, said predefined area containing substantially only said plurality of clocked logic elements, said logic block disposed proximate to said buffer block.

36. The method of claim 35 wherein: said providing a clock signal from a first (n-1)th-level modular buffer further comprises providing clock signals from a plurality of (n-1)th-level modular buffers, said plurality of (n-1)th-level modular buffers disposed within said buffer block and including said first (n-1)th-level modular buffer;

said implementing a first nth level modular buffer further comprises implementing each nth-level modular buffer of a plurality of nth level modular buffers using one or more predefined buffers selected from said finite set of predefined buffers, said plurality of nth-level modular buffers including said first nth-level modular buffer;

said receiving said clock signal from said (n-1)th-level modular buffer further comprises receiving said clock signals from said plurality of (n-1)th-level modular buffers at a corresponding nth-level modular buffer of a plurality fourth-level modular buffers; and said distributing said clock signal further comprises distributing said clock signals received by said plurality of first nth-level modular to a plurality of clocked logic elements disposed within a corresponding predefined area of a plurality of predefined areas of a logic block, said logic block disposed proximate to said buffer block.

37. The method of claim 36 wherein a nth-level modular buffer of said plurality of nth-level modular buffers is implemented by connecting in parallel a plurality of predefined buffers selected from said finite set of predefined buffers.

38. The method of claim 36 wherein said (n-1)th-level modular buffer is implemented with a buffer selected from a finite set of predefined modular buffers having differing sizes, wherein said selection of a particular predefined modular buffer of said finite set of predefined modular buffers is dependent on a capacitive load coupled to said (n-1)th-level modular buffer.

* * * * *